Nov. 28, 1961    I. Z. SMOKER ET AL    3,010,726
MANURE SPREADER

Filed Feb. 24, 1958    8 Sheets-Sheet 1

INVENTORS
Isaac Z. Smoker,
Clayton Richey
BY John B. Brady
ATTORNEY

United States Patent Office 3,010,726
Patented Nov. 28, 1961

3,010,726
MANURE SPREADER
Isaac Z. Smoker, Intercourse, and Clayton Ritchey, Hopewell, Pa., assignors to Sperry Rand Corporation, New Holland, Pa., a corporation of Delaware
Filed Feb. 24, 1958, Ser. No. 716,982
17 Claims. (Cl. 275—4)

Our invention relates broadly to manure spreaders and more particularly to a construction of manure spreader having means for loading, transporting, and distributing fertilizer while retaining the maximum fertilization values of the humus and the associated liquids therein for fertilization.

One of the objects of our invention is to provide a construction of manure spreader comprising a tiltable body supported on a chassis which mounts a fertilizer distributor means thereon in a position for distributing fertilizer from the tilted body as the fertilizer is gravitated onto a conveyor mounted in one end of the interior of the body intermediate the body and the fertilizer distributor on the chassis, whereby the fertilizer and the associated liquids therein may be scattered over the area to be fertilized.

Another object of our invention is to provide a construction of manure spreader comprising a chassis for mounting a fertilizer distributing means thereon and with respect to which a liquid-tight body structure for receiving manure and the associated liquids therein may be hydraulically tilted into a position for gravitating the contents of the body structure into the fertilizer distributing means, with an endless conveyor interposed between the end of the body structure and the fertilizer distributor means for insuring an even distribution of the fertilizer over the area being fertilized.

A further object of our invention is to provide a construction of manure spreader having a liquid-tight body structure adapted to be loaded with humus and associated liquid where the body structure is pivotally mounted at one end on a wheeled chassis, with a liquid-tight well interposed between the pivoted end of the body structure and the chassis and wherein there is swingably mounted an endless conveyor adapted to be raised or lowered out of or into the well and positively driven for delivering the humus and associated liquid to a rotatably driven distributor carried by the wheeled chassis for effecting the distribution of the humus and associated liquid uniformly over the area being fertilized.

Still another object of our invention is to provide a construction of manure spreader including a chassis having a rotatable distributor thereon adapted to receive fertilizer and the associated liquid from a tiltable body structure, where means are provided for selectively controlling the speed of operation of the rotatable distributor in timed relation to the delivery thereto of the fertilizer and associated liquid from the tilted body structure.

Other and further objects of our invention reside in the tiltable body manure spreader structure of our invention as set forth more fully in the specification hereinafter following by reference to the accompanying drawings in which:

FIG. 3 is a view similar to the view illustrated in FIG. 2 but showing the body structure elevated for discharge during the spreading operation;

FIG. 6 is a perspective view looking at the rear of the manure spreader and illustrating particularly the distributor operating in conjunction with the feeder conveyor of the manure spreader;

FIG. 7 is a perspective view looking toward the rear of the body structure and showing the feeder conveyor interiorly of the wheel at the end of the body structure for feeding the manure into the distributor at the rear of the chassis;

After long investigation of the fertilization properties of manure in farming operations, we have been impressed by the increased advantages of distributing manure over the area to be fertilized where the manure is in a condition wherein the humus is saturated with the associated liquids. In this moist condition the manure becomes an effective fertilizer for the farm land. We accomplish this result by mounting upon a wheeled chassis a body structure which is liquid-tight and into which the manure is loaded from the barns with the associated liquids therein. The loaded body structure is transported on the wheeled chassis drawn by a tractor to the area to be fertilized and is then elevated around a transverse pivot adjacent the rear of the chassis for gravitating the contents of the body structure toward a well formed in the rear end of the body structure. Within this well we locate an endless conveyor which is driven at selected speed from power delivered from the tractor which draws the wheeled chassis. This conveyor operates to move the manure with the associated liquids therein into the path of operation of a distributor mechanism which discharges the manure rearwardly onto the ground.

The distributor mechanism per set is of conventional design. In the illustrated preferred embodiment of the invention it includes a pair of beater shafts having beater members thereon and a wide spread device, or scatterer. It is not intended however that the invention be limited to the specific distributor mechanism shown, since other conventional distributor mechanisms may be employed. The distributor mechanism is driven in timed relation to the operation of the conveyor for moving the manure saturated with the associated liquids into position for scattering at a required rate to secure the correct depth of fertilization for the particular farm land to be treated. The selective controls are all operated from the driver's position on the tractor. The conveyor is so installed in the well at the rear end of the body structure that the conveyor may be swung outwardly about a transverse pivot adjacent the top of the body structure for the purpose of cleaning out the well at the rear end of the body structure. Inasmuch as the manure spreader of our invention must carry relatively heavy loads over the relatively rough terrain of the farm land we make special provision for mounting each wheel assembly for the chassis to permit relative orientation of the wheel assemblies as the chassis moves over rough terrain for maintaining the body structure substantially level independently of the orientation of the wheel assemblies as they move over the relatively rough terrain.

Figure 17:
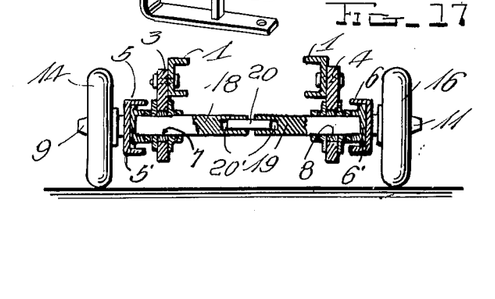
FIG. 17 is a vertical sectional view on line 17—17 of FIG. 16.

Referring to the drawings in more detail, reference character 1 designates the chassis of the manure spreader of our invention adapted to be connected, at its front end 2, to a tractor and pulled from a loading location to the fertilizer distributing location. The chassis 1 is provided at the opposite sides of the rear thereof with downwardly extending bracket members 3 and 4 which provide journals for transversely extending axle members 18 and 19, shown more clearly in FIG. 17, as pivoted at 7 and 8 in brackets 3 and 4, respectively. The longitudinally extending wheel mounts 5 and 6 carry journaling means or rotatively mounted spindles at 9 and 10, and 11 and 12, mounting the sets of the pneumatically tired wheels shown at 14 and 15, and 16 and 17. The axle members 18 and 19 are rigidly attached to wheel mounts 5 and 6, respectively, as shown at 5' and 6'. The solid axle members 18 and 19 are aligned and rotatively joined by an axially extending member as shown at 20, fitted into holes 20' provided in the corresponding ends of said axle members. The difference in elevation of opposite wheels and thus the difference in elevation angle of the wheel mounts 5 and 6 with respect to each other as the chassis moves over relatively rough terrain generally encountered in farm lands is compensated for by rotative movement of axle members 18 and 19 with respect to each other about member 20.

Figure 1:
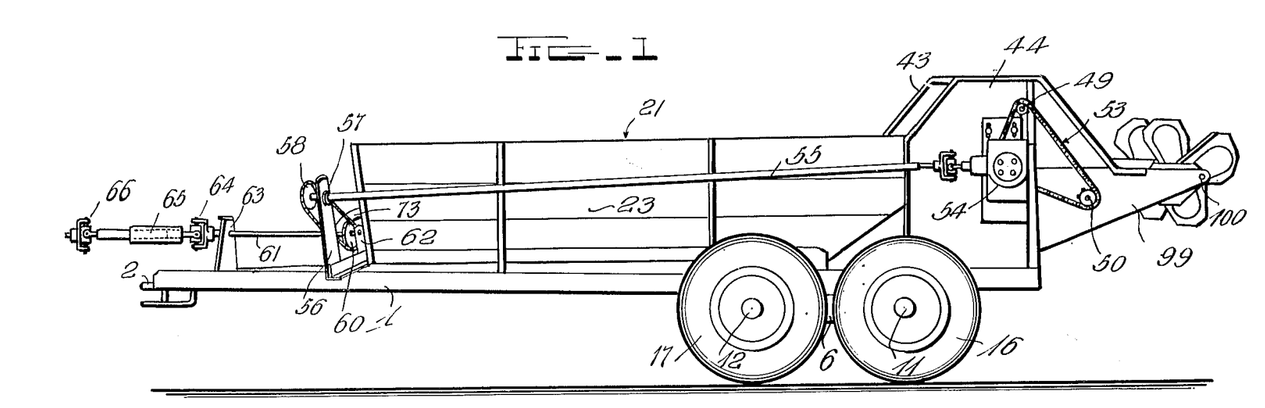
FIG. 1 is a side elevational view of the manure spreader of our invention illustrated in position for loading, the view being shown slightly in perspective.
Figure 2:
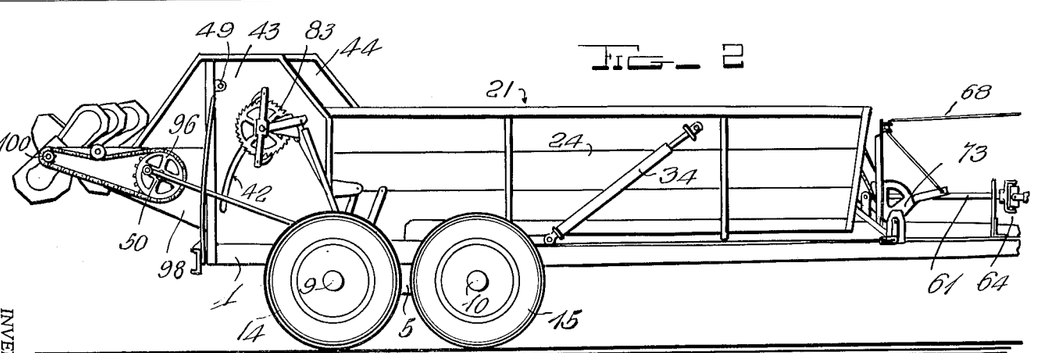
FIG. 2 is a side elevational view of the opposite side of the manure spreader also illustrated slightly in perspective.

The body structure for receiving, transporting and discharging the load is shown at 21 formed by a liquid-tight enclosure having side walls 23 and 24 extending between the pneumatically tired wheels and closed by an end wall at the front shown at 25 and an inclined well 26 at the rear thereof. The well 26 extends beneath the bottom 27 of the body structure as shown at 28 and establishes a fluid-tight connection therewith. The side walls 23 and 24 have brackets on the opposite exterior sides thereof as represented at 29 and 30 where the brackets carry outwardly extending pintles 31 and 32 which fit within cooperating brackets 33 extending upwardly from opposite sides of the chassis 1, enabling the body structure 21 to be raised from the horizontal position for loading and transportation as illustrated in FIGS. 1 and 2 to the inclined position illustrated in FIG. 3 for discharge of the contents of the body structure. This operation is effected by a hydraulic cylinder 34 pivoted to the chassis 1 as represented at 34a and controlling piston rod 34b which connects with the upper portions of the sides of the body structure 21. The hydraulic cylinder 34 is activated by fluid supplied from the tractor through the pipe line indicated at 36. The hydraulic cylinder 34 is double-acting and the hydraulic system functions to both raise the body structure 21 upwardly for dumping as shown in FIG. 3, and to retract the body structure 21 for loading and transportation as represented in FIGS. 1 and 2.

Figure 4:
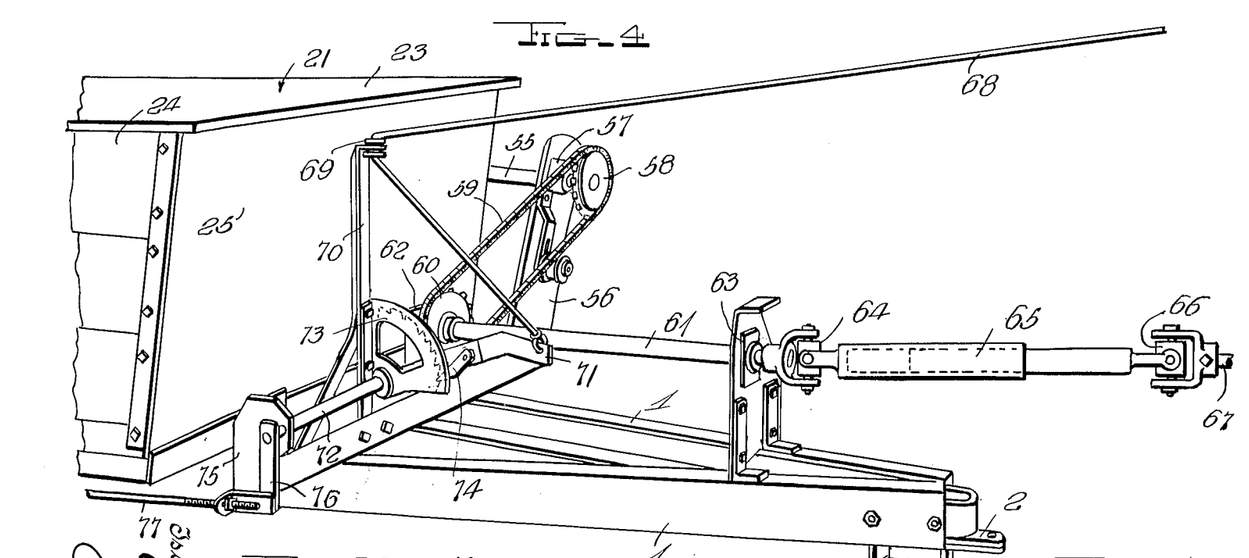
FIG. 4 is a perspective view of a fragmentary part of the front of the manure spreader illustrating the drive means extending from the tractor for operating the mechanism on the manure spreader.
Figures 5, 10:
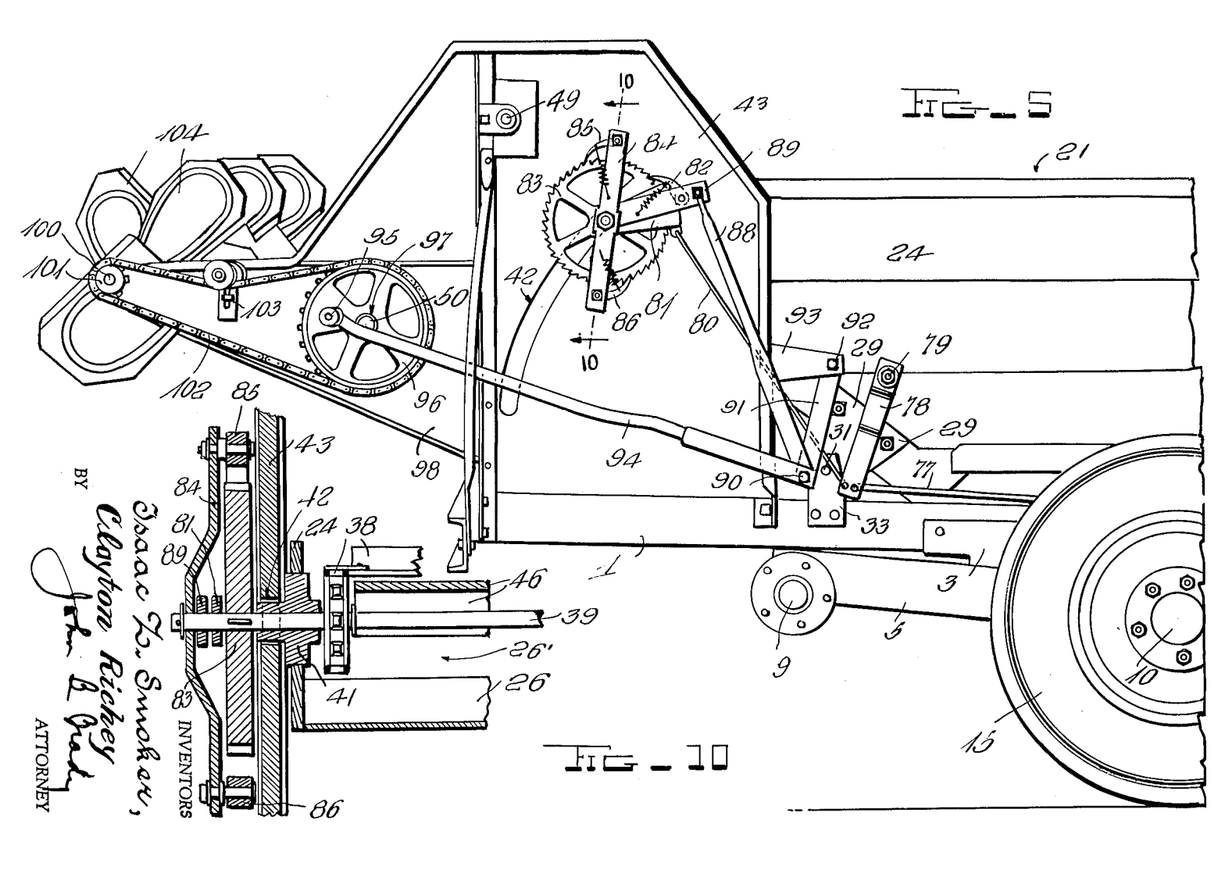
FIG. 5 is a side elevational view on a somewhat larger scale of the rear end of the manure spreader, one of the wheels of the wheeled chassis being removed to illustrate the linkages forming part of the timing mechanism for selectively controlling the speed of operation of the distributor.
FIG. 10 is a fragmentary vertical sectional view on an enlarged scale on line 10—10 of FIG. 5.
Figure 5:
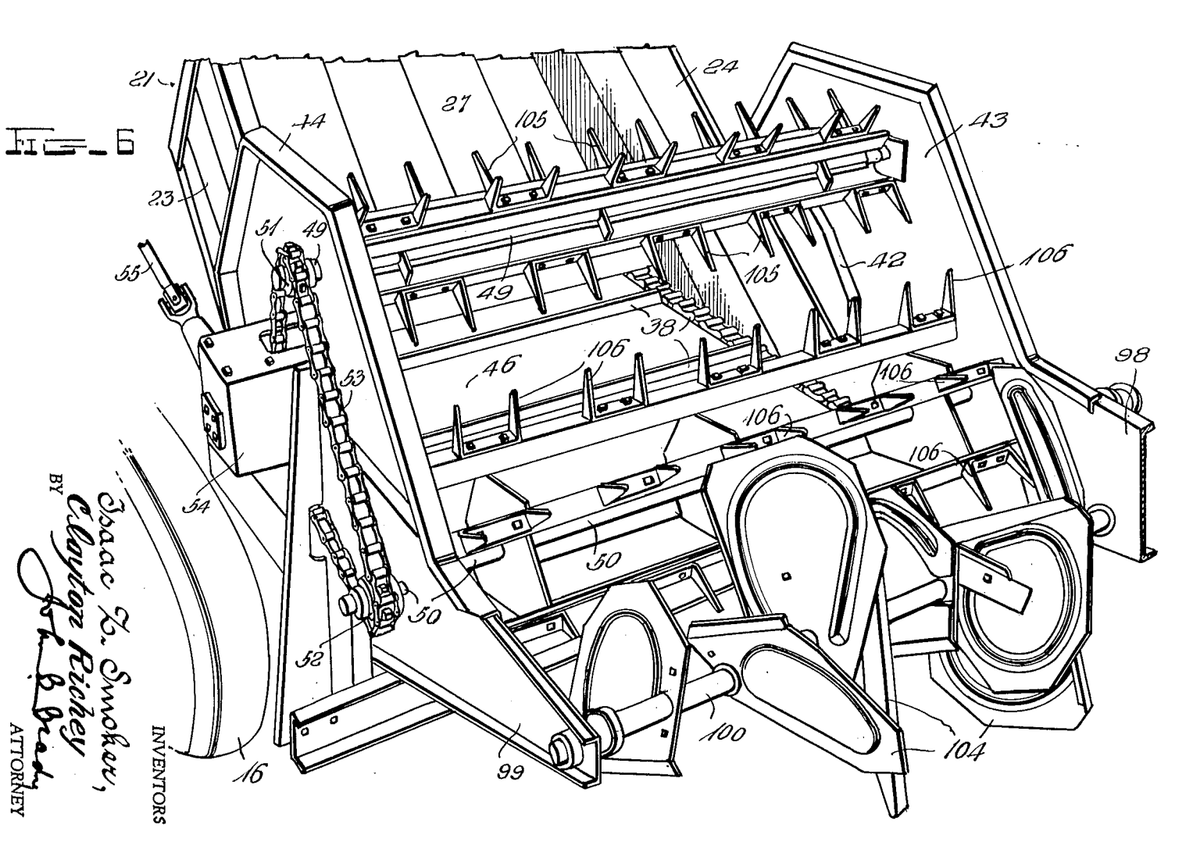
Figures 14, 15:
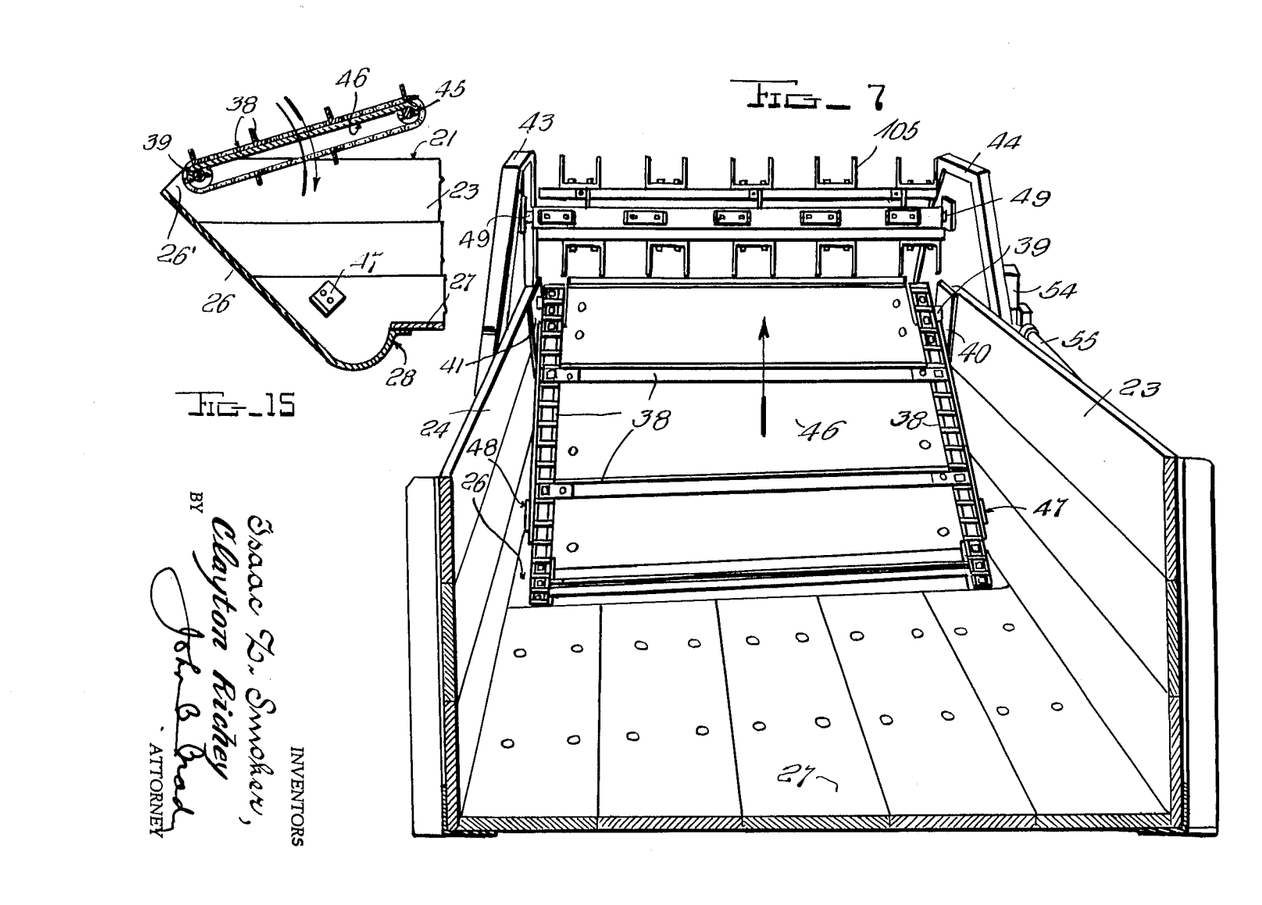
FIG. 15 is a fragmentary longitudinal sectional view through the end portion of the fluid-tight body structure at the well thereof and showing the manner in which the endless conveyor is pivotally mounted adjacent the top of the body structure enabling the conveyor to be swung upwardly out of the well for cleaning purposes.
Figure 16:
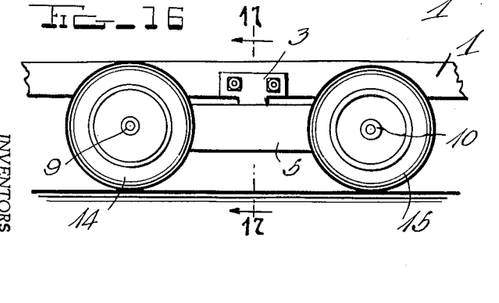
FIG. 16 is a fragmentary side elevational view of the wheeled support for the chassis of the manure spreader showing particularly the manner of mounting the chassis to eliminate undue side-sway of the body structure when heavily loaded and traversing a relatively rough terrain.

The well 26 at the rear of the body structure 21 serves as a housing to receive the endless conveyor 38, the upper end of which is mounted on a transverse shaft 39 which extends between brackets 40 and 41 in the interior of the side walls 23 and 24. The shaft 39 extends beyond the side wall and through an arcuate slot 42 formed in one of the upwardly projecting sides of the chassis 1 represented at 43. The other side of the chassis 1 carries an upwardly extending aligned side 44. Both sides 43 and 44 are located at the rear of the chassis 1 and in positions extending exteriorly of the side walls 23 and 24 so that the body structure 21 as it is moved from the horizontal position illustrated in FIGS. 1 and 2 rocks angularly between the upward projecting side walls 43 and 44 of the chassis 1 with the shaft 39 of the conveyor 38 projecting through slot 42 in the upwardly projecting side wall 43 of the chassis, as shown. The lower end of the conveyor 38 is mounted on a shaft 45 journaled in a frame structure 46 which extends from the shaft 39 enabling the conveyor 38 to be driven in an upward direction as viewed in FIG. 7 for discharging the contents of the body structure 21 into the distributor mounted between the upwardly projecting side walls 43 and 44 of the chassis 1. The frame 46 on which the conveyor 38 is mounted may be readily swung from the position illustrated in FIG. 13 to the position illustrated in FIG. 15 for purposes of cleaning. Supporting brackets 47 and 48 are mounted interiorly of the walls 23 and 24 for supporting outwardly projecting portions of the frame 46 while the conveyor 38 is operating within the well 26. Upon lifting the conveyor 38 as shown in FIG. 15, agglomerate collected in the well 26 may be readily cleaned out. In the preferred embodiment of the invention, the distributor mechanism includes a pair of transverse beater shafts 49 and 50 journalled in and extending between side walls 43 and 44 of the chassis 1. Shafts 49 and 50 project through the side wall 44 and carry sprocket wheels 51 and 52 thereon which are engaged by sprocket chain 53 driven from gear box 54 mounted on the exterior of the upstanding side 44 of the chassis. The gear box 54 houses a reduction gear which is driven through shaft 55 from the tractor through the gearing shown more clearly in FIG. 4. This arrangement of gearing includes an upwardly extending standard 56 supported by chassis 1 and journaling the end of shaft 55 at 57. The shaft 55 extends through standard 56 as shown more clearly in FIG. 4 and carries sprocket wheel 58 thereon. The sprocket wheel 58 is driven through sprocket chain 59 operated from sprocket wheel 60 carried by shaft 61 journaled from brackets 62 and 63 supported from chassis 1. Shaft 61 is driven through the universal joint 64 and the telescopic shaft 65 and universal joint 66 to a shaft 67 which extends to the tractor and which receives rotary driving power therefrom.

Figure 8:
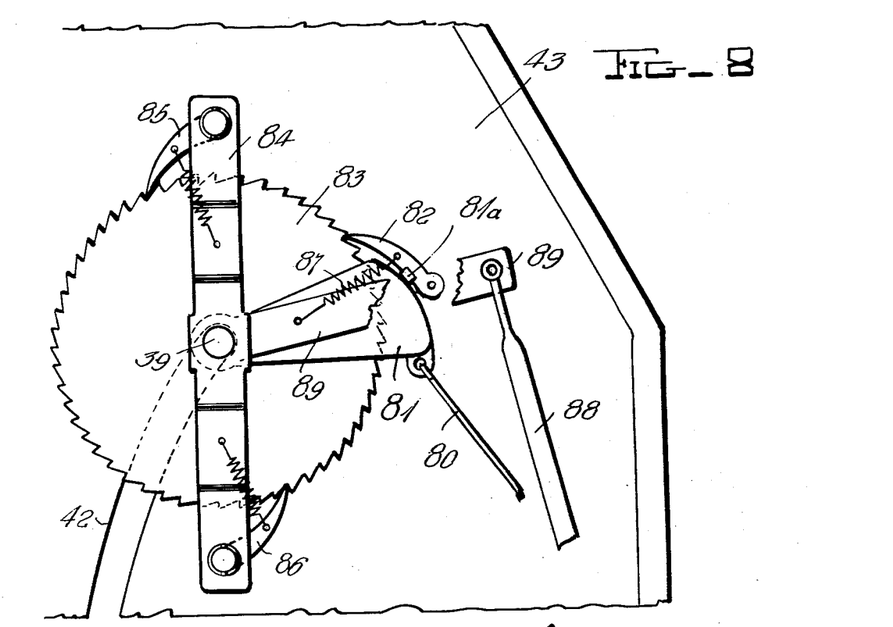
FIG. 8 is an enlarged side elevational view of the timing mechanism for selectively controlling the speed of operation of the distributor.
Figure 9:
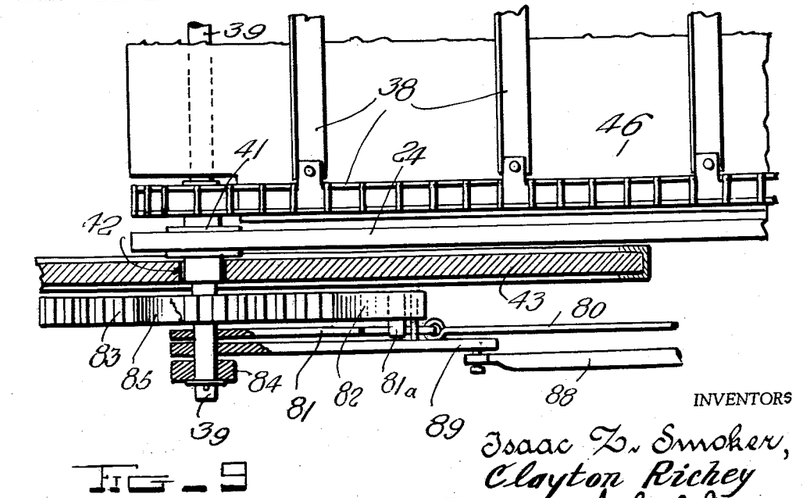
FIG. 9 is a top plan view of the timing mechanism shown in FIG. 8.

The tractor operator also controls the cable 68 which passes through an eyelet 69 supported by bracket 70 extending upwardly from chassis 1 adjacent the front of the body structure 21 and connects with lever 71 carried by transversely extending shaft 72 in a position adjacent the quadrantal guide 73 supported on shaft 70. The lever 71 carries a pawl 74 adapted to engage the quadrantal guide 73 for selectively setting shaft 72 from a desired position with respect to quadrantal guide 73. The transverse shaft 72 is journaled between the quadrantal guide 73 mounted on bracket 70 and the standard 75 supported from chassis 1. Transverse shaft 72 extends beyond standard 75 and is provided with a crank arm 76 thereon to which is attached the control rod 77. Control rod 77 extends rearwardly of chassis 1 and connects to the arm 78 pivoted at 79 to the side wall 24 of body structure 21. The arm 78 connects with a link 80 which extends to the cam 81 pivoted on the extension of the conveyor drive shaft 39. Movement of link 80 by movement of control rod 77, which swings lever arm 78, serves to displace cam 81 which, as shown more clearly in FIG. 8, rides beneath the pawl 82 and determines the engagement of the pawl with the teeth of ratchet 83 carried by the extension of conveyor drive shaft 39. The pawl 82 includes a transversely extending projection 81a thereon which extends above the cam 81 controlling the position of pawl 82 so that the pawl may be engaged with each successive tooth of ratchet 83 or may be made to engage each alternate tooth or escape engagement of a plurality of teeth thereby controlling the speed at which shaft 39 is moved for correspondingly controlling the speed of movement of the conveyor. We provide a diametrically extending arm 84 associated with the drive shaft 39 and ratchet 83. The arm 84 carries a spring-actuated detent at each end thereof, shown at 85 and 86, for maintaining conveyor drive shaft 39 in the particular position to which it is moved under control of pawl 82. Pawl 82 is biased into ratchet-engaging position by means of spring 87 which allows the pawl 82 to ride over the teeth of the ratchet 83 intermediate each conveyor drive operation. The movement of the conveyor is controlled in timed relation to the movement of the scatterer by means of the link 88 which connects to the end of lever 89 which carries the pawl 82. As the link 88 is moved, arm 89 moves carrying with it pawl 82. Link 88 is pivotally connected at 90 with the end of lever arm 91 pivoted at 92 on bracket 93 fastened to the upwardly extending side wall 43 of the chassis. The end of arm 91 also provides a pivotal mounting for crank 94 which connects to an off-center location 95 on sprocket wheel 96 journaled at 97 to shaft 50 located on rearwardly extending bracket 98 extending from the rear of side wall 43 of the chassis. A similar rearwardly extending bracket is provided at the rear of upward projection 44 on the other side of chassis 1 as shown at 99, and these serve to journal the transversely extending scatterer shaft 100 and shaft 50 on which beaters 106 are located. Scatterer shaft 100 has sprocket wheel 101 thereon which is driven from sprocket wheel 96 through sprocket chain 102 which may be tensioned by means of the adjustable roller device 103. The scatterer blades 104 are shown in position for receiving the fertilizer delivered from the beaters 105 and 106 driven by shafts 49 and 50. Sprocket wheel 96 is driven in turn by shaft 50 which is driven on the opposite end thereof by sprocket chain 53 as mentioned earlier. From the above it can be seen that scatterer shaft 100 and ratchet 83 of conveyor 38 both obtain their rotative movement from shaft 50. The former obtains its rotating motion directly from a chain drive coupling with shaft 50 while the latter obtains its rotative movement through a crank and pawl drive link with shaft 50.

Figures 11, 13, 14:
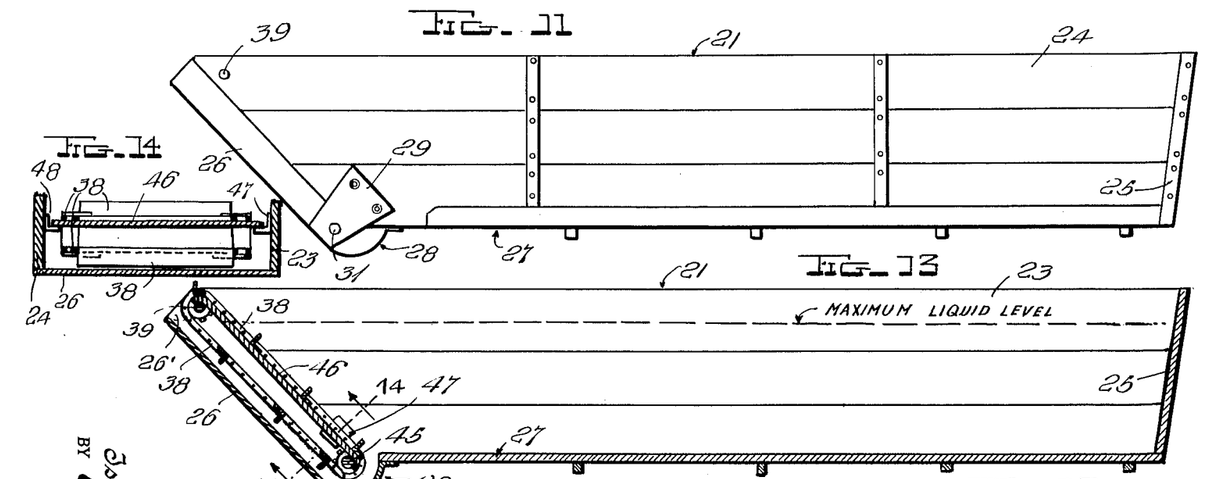
FIG. 11 is a side elevational view of the fluid-tight body structure of the manure spreader.
FIG. 13 is a longitudinal sectional view taken on line 13—13 of FIG. 12.
FIG. 14 is a transverse sectional view taken on line 14—14 of FIG. 13.
Figure 12:
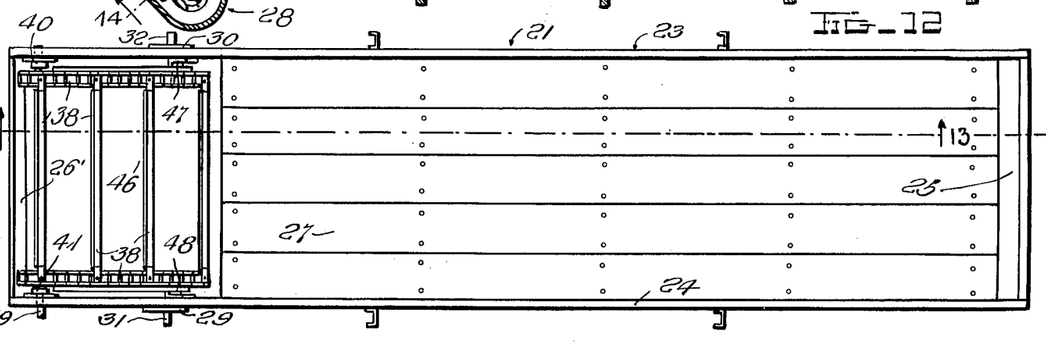
FIG. 12 is a top plan view of the fluid-tight body structure shown in FIG. 11.

The maximum maintainable liquid level in the liquid-tight body structure is indicated by a labeled dashline in FIG. 13. With this high maintainable liquid level a large load of manure saturated with the associated liquids may be transported from the farm buildings to distant fields to be fertilized without any loss along the way of the said associated liquids. Thus, there is no waste of any portion of the manure-liquid combination. Another important advantage is that none of the liquid associated with the manure is dripped or spilled from the body structure in the vicinity of the farm buildings, farm house, etc., or on the roadways; thus unpleasant odors are prevented from accruing and roadways are kept clear from mud formed by liquids thus spilled. Therefore, this liquid-tight body structure aids in maintaining a more healthful atmosphere around the farm buildings and can transport liquid saturated-manure without damaging farm roads.

Referring to FIG. 13, as the body structure 21 is raised the liquid which has settled to the bottom of the body flows into the well 26, between shaft 45 and the adjacent end of bottom member 27, along the bottom of well 26 and is deposited on the ground through the opening provided beneath shaft 39 as indicated at 26'.

We have found the equipment of our invention as herein set forth highly practical in its construction and operation and while we have described our invention in certain preferred embodiments, we realize that modifications may be made and we desire that it be understood that no limitations upon our invention are intended other than may be imposed by the scope of the appended claims.

What we claim as new and desire to secure by Letters Patent of the United States is as follows:

1. A manure spreader comprising a wheeled chassis, a liquid tight body structure disposed longitudinally of said chassis and journaled adjacent the rear end thereof and tiltable about the journaled end thereof whereby said body structure may be raised to an inclined position above the front end of said chassis for gravitating manure and associated liquid toward the rear end of the body structure, upwardly extending side walls located on the rear end of said chassis immediately adjacent the rear end of said body structure between which said body structure is adapted to be tilted, distributor mechanism carried by said side walls and journaled therebetween, means carried by the rear end of said body structure for feeding manure and associated liquids into said distributor mechanism while said body structure is maintained in a tilted position, means pivotally mounted at one end of said chassis and pivotally connected at the other end with said body structure for raising and lowering said body structure with respect to said chassis about the journaled end thereof, drive means on said chassis for driving said distributor mechanism and said means for feeding the manure and associated liquid into said distributor mechanism, said liquid tight body structure terminating in a transverse well in a position adjacent the journal about which said body structure is tiltable, the means carried by said body structure for feeding manure and associated liquid into said distributor mechanism comprising an endless conveyor, a frame supporting said conveyor, a shaft extending normal to the side walls of said liquid tight body structure adjacent the top thereof and adjacent said well, inwardly directed brackets mounted on the interior of the side walls of said body structure adjacent the bottom thereof, and means for swingably mounting said frame on said shaft whereby said frame and the conveyor thereon may be pendantly moved into and out of said well limited by abutment of the lower end of said frame with said brackets for maintaining said conveyor in a position spaced from the side wall of said well, said conveyor when swung about said transverse shaft out of said well affording access to the interior of said well for cleaning purposes.

2. A manure spreader comprising a wheeled chassis, a liquid tight body structure disposed longitudinally of said chassis and journaled adjacent the rear end thereof and tiltable about the journaled end thereof whereby said body structure may be raised to an inclined position above the front end of said chassis for gravitating manure and associated liquid toward the rear end of the body structure, upwardly extending side walls located on the rear end of said chassis immediately adjacent the rear end of said body structure between which said body structure is adapted to be tilted, distributor mechanism carried by said side walls and journaled therebetween, means carried by the rear end of said body structure for feeding manure and associated liquids into said distributor mechanism while said body structure is maintained in a tilted position, means pivotally mounted at one end of said chassis and pivotally connected at the other end with said body structure for raising and lowering said body structure with respect to said chassis about the journaled end thereof, drive means on said chassis for driving said distributor mechanism and said means for feeding the manure and associated liquid into said distributor mechanism, the end of said liquid tight body structure terminating in a well extending transversely between the opposite side walls of the liquid tight body structure and below the bottom thereof, said means carried by said body structure for feeding manure and associated liquid into said distributor mechanism including a shaft extending transversely between the side walls of said liquid-tight body structure adjacent the top thereof spaced from the end of said well, an endless conveyor frame supported by said shaft, brackets mounted on the interior side walls of said body structure adjacent the part of said well which extends below the bottom of said body structure for limiting the movement of said conveyor frame toward said well and an endless conveyor carried by said conveyor frame and movable into and out of said well.

3. A manure spreader comprising a wheeled chassis, a liquid tight body structure disposed longitudinally of said chassis and journaled adjacent the rear end thereof and tiltable about the journaled end thereof whereby said body structure may be raised to an inclined position above the front end of said chassis for gravitating manure and associated liquid toward the rear end of the body structure, upwardly extending side walls located on the rear end of said chassis immediately adjacent the rear end of said body structure between which said body structure is adapted to be tilted, distributor mechanism carried by said side walls and journaled therebetween, means carried by the rear end of said body structure for feeding manure and associated liquids into said distributor mechanism while said body structure is maintained in a tilted position, means pivotally mounted at one end of said chassis and pivotally connected at the other end with said body structure for raising and lowering said body structure with respect to said chassis about the journaled end thereof, drive means on said chassis for driving said distributor mechanism and said means for feeding the manure and associated liquid into said distributor mechanism, one of said upwardly extending side walls located on the end of said chassis including an arcuate slot therein, and said means carried by said body structure for feeding manure and associated liquid into said distributor mechanism comprising an endless conveyor pendantly supported in the rear end of said body structure by a transverse shaft journaled in the upper portion of the rear end of said body structure for driving said endless conveyor, one end of said transverse shaft extending through the arcuate slot in the said side wall of the chassis and movable in a curved path in said arcuate slot as the body structure is tilted, and means engaging the extended end of said transverse shaft for rotatively driving said endless conveyor independently of the position in which said body structure is tilted.

4. A manure spreader comprising a wheeled chassis, a liquid tight body structure disposed longitudinally of said chassis and journaled adjacent the rear end thereof and tiltable about the journaled end thereof whereby said body structure may be raised to an inclined position above the front end of said chassis for gravitating manure and associated liquid toward the rear end of the body structure, upwardly extending side walls located on the rear end of said chassis immediately adjacent the rear end of said body structure between which said body structure is adapted to be tilted, distributor mechanism carried by said side walls and journaled therebetween, means carried by the rear end of said body structure for feeding manure and associated liquids into said distributor mechanism while said body structure is maintained in a tilted position, means pivotally mounted at one end of said chassis and pivotally connected at the other end with said body structure for raising and lowering said body structure with respect to said chassis about the journaled end thereof, drive means on said chassis for driving said distributor mechanism and said means for feeding the manure and associated liquid into said distributor mechanism, one of said upwardly extending side walls located on the end of said chassis including an arcuate slot therein said means carried by said body structure for feeding manure and associated liquid into said distributor mechanism comprising an endless conveyor pendantly supported in the rear end of said body structure, a transverse shaft journaled in the upper portion of the rear end of said body structure for driving said endless conveyor, one end of said transverse shaft projecting through the arcuate slot in said side wall of the chassis and movable in a curved path in said arcuate slot as the body structure is tilted, means engaging the extended end of said transverse shaft for imparting unidirectional pulse forces to said shaft for correspondingly moving said endless conveyor in pulses independently of the position in which said body structure is tilted and means controllable from said chassis for predetermining the time period of application of said driving pulses.

5. A manure spreader comprising a wheeler chassis, a liquid tight body structure disposed longitudinally of said chassis and journaled adjacent the rear end thereof and tiltable about the journaled end thereof whereby said body structure may be raised to an inclined position above the front end of said chassis for gravitating manure and associated liquid toward the rear end of the body structure, upwardly extending side walls located on the rear end of said chassis immediately adjacent the rear end of said body structure between which said body structure is adapted to be tilted, distributor mechanism carried by said side walls and journaled therebetween, means carried by the rear end of said body structure for feeding manure and associated liquids into said distributor mechanism while said body structure is maintained in a tilted position, means pivotally mounted at one end of said chassis and pivotally connected at the other end with said body structure for raising and lowering said body structure with respect to said chassis about the journaled end thereof, drive means on said chassis for driving said distributor mechanism and said means for feeding the manure and associated liquid into said distributor mechanism, said distributor mechanism including a scatterer rotatably carried by said upwardly extending side walls and extending therebetween, said means carried by said body structure for feeding manure and associated liquid into said distributor mechanism comprising an endless conveyor pendantly supported in the rear end of said body structure, a shaft connected with said endless conveyor and projecting from one side of said body structure and through an arcuate slot in one of the upwardly extending side walls of said chassis and connecting means between the drive means on said chassis for rotatably driving said distributor mechanism for driving said endless conveyor.

6. A manure spreader comprising a wheeled chassis, a liquid tight body structure disposed longitudinally of said chassis and journaled adjacent the rear end thereof and tiltable about the journaled end thereof whereby said body structure may be raised to an inclined position above the front end of said chassis for gravitating manure and associated liquid toward the rear end of the body structure, upwardly extending side walls located on the rear end of said chassis immediately adjacent the rear end of said body structure between which said body structure is adapted to be tilted, distributor mechanism carried by said side walls and journaled therebetween, means carried by the rear end of said body structure for feeding manure and associated liquids into said distributor mechanism while said body structure is maintained in a tilted position, means pivotally mounted at one end of said chassis and pivotally connected at the other end with said body structure for raising and lowering said body structure with respect to said chassis about the journaled end thereof, drive means on said chassis for driving said distributor mechanism and said means for feeding the manure and associated liquid into said distributor mechanism, said distributor mechanism including a scatterer rotatably carried by said upwardly extending side walls and extending therebetween, means on said chassis for rotatably driving said distributor mechanism, said means carried by said body structure for feeding manure and associated liquid into said distributor mechanism comprising an endless conveyor, a transverse shaft journaled adjacent the top of said body structure at the rear end thereof for supporting said conveyor, the said shaft projecting from one side of said body structure and through an arcuate slot in one of the upwardly extending side walls of said chassis and a link assembly driven by the means on said chassis for rotatably driving said distributor mechanism connected with said transverse shaft for imparting unidirectional pulses to said transverse shaft for imparting step by step movement to said conveyor and means on said chassis for predetermining the speed at which the unidirectional pulses are applied to said conveyor.

7. A body structure for a manure spreader comprising a polygonally shaped liquid tight enclosure including a bottom, longitudinally extending side walls and outwardly inclined end walls connected with said bottom, one of said end walls being constituted by a well having a downwardly extending transverse receptacle therein, a transversely extending shaft journaled adjacent the top of said side walls at the well end of said body structure, a conveyor frame pendantly supported by said shaft and an endless conveyor mounted on said conveyor frame and driven by said shaft, said conveyor extending into the receptacle within said well and means for driving said conveyor.

8. A body structure for a manure spreader as set forth in claim 7, in which said body structure includes oppositely aligned brackets projecting inwardly from the interior walls of said body structure and spaced above said well and forming support means for engaging said conveyor frame for maintaining said conveyor frame in spatial relation to the interior wall of said well for enabling said endless conveyor to move into and out of said transverse receptacle between said conveyor frame and the interior wall of said well.

9. A body structure for a manure spreader as set forth in claim 7, in which said downwardly extending transverse receptacle projects below the bottom of the said body structure and provides a collector for liquid contained within said body structure and wherein said conveyor extends into the part of said well which projects below the bottom of said body structure.

10. A body structure for a manure spreader as set forth in claim 7, in which the said well terminates on a level below the bottom of said polygonally shaped liquid tight enclosure and determines the maximum liquid level which may be contained within said body structure and wherein said endless conveyor extends above said maximum liquid level line of said body structure.

11. A body structure for a manure spreader as set forth in claim 7, in which said conveyor frame and said conveyor have widths less than the transverse distance between said side walls whereby said frame is swingable in an orbit around said transverse shaft for raising said endless conveyor out of said well and receptacle around said transverse shaft as a pivot for providing access to the receptacle in said well beneath the conveyor for cleaning the interior of the receptacle and well.

12. A manure spreader comprising a wheeled chassis movable over the ground in a forward direction, a pair of spaced vertically extending side walls fixedly mounted on the rear end of said chassis, a manure distributor mechanism rotatably carried by said walls and extending therebetween in a fixed position above said chassis for distributing manure rearwardly of said walls, a fluid tight body mounted on said chassis for pivotal movement relative thereto about a transverse axis adjacent the rear end of said chassis, said body having a rear portion extending between said fixed side walls and comprising side walls, a bottom and front and rear end walls, a conveyor carried by said body for feeding manure rearwardly over said rear end wall and to said distributor mechanism, and means on said chassis to pivot said body about said axis to elevate the front end thereof relatively to said chassis to thereby gravitate manure and associated liquid rearwardly.

13. A manure spreader comprising a wheeled chassis, a liquid tight body structure disposed longitudinally of said chassis and journaled adjacent the rear end thereof whereby the front end of said body structure may be raised above said chassis for gravitating manure and associated liquid toward the rear end of said body structure, a pair of upwardly extending side walls fixedly mounted on the rear end of said chassis immediately adjacent the rear end of said body structure between which said body structure is adapted to be tilted, conveying means carried by the rear end of said body structure for feeding manure and associated liquid rearwardly between said fixedly mounted side walls, distributor mechanism carried by said side walls and journaled therebetween in a fixed position above the rear end of said chassis for receiving manure from said conveying means and distributing the same rearwardly between said fixed side walls, means pivotally mounted at one end on said chassis and pivotally connected at the other end with said body structure for raising and lowering said body structure with respect to said chassis about the journaled end thereof, and drive means on said chassis for driving said distributor mechanism and said conveying means.

14. A manure spreader comprising a wheeled chassis, a liquid tight body structure disposed longitudinally of said chassis and journaled adjacent the rear end thereof whereby the front end of said body structure may be raised above said chassis for gravitating manure and associated liquid toward the rear end of said body structure, a pair of upwardly extending side walls fixedly mounted on the rear end of said chassis immediately adjacent the rear end of said body structure and between which said body structure is adapted to be tilted, conveying means carried by the rear end of said body structure for feeding manure and associated liquid rearwardly between said fixedly mounted side walls, distributor mechanism carried by said side walls and journalled therebetween in a fixed position above the rear end of said chassis for receiving manure from said conveying means and distributing the same rearwardly between said fixed side walls, said distributor mechanism consisting of at least a pair of beater shafts having beater members thereon with one end of each of said shafts projecting beyond one side wall and the other end of at least one of said beater shafts projecting beyond the opposite side wall beyond the tilting path of said body structure and a scatterer journalled between said side walls for receiving manure and associated liquid from said beater members, means carried by the extended end of said last mentioned one of said beater shafts outside said last mentioned side wall for driving said scatterer, means extending around said body structure and supported by said chassis for driving said beater shafts from a position outside said first mentioned side wall, and means pivotally mounted at one end on said chassis and pivotally connected at the other end with said body structure for raising and lowering said body structure with respect to said chassis about the journalled end thereof.

15. A manure spreader comprising a wheeled chassis, a liquid tight body structure disposed longitudinally of said chassis and journalled adjacent the rear end thereof whereby the front end of said body structure may be raised above said chassis for gravitating manure and associated liquid toward the rear end of said body structure, a pair of upwardly extending side walls fixedly mounted on the rear end of said chassis immediately adjacent the rear end of said body structure and between which said body structure is adapted to be tilted, conveying means carried by the rear end of said body structure for feeding manure and associated liquid rearwardly between said fixedly mounted side walls, said conveying means comprising an endless conveyor located in the rear end of said body structure adjacent the journal of said body structure on said chassis, one of said upwardly extending side walls defining an arcuate slot, a transverse shaft supporting and driving said endless conveyor and having an end which projects beyond one side of said body structure and through said slot, means mounted exteriorly of said last mentioned side wall for driving said transverse shaft for imparting feeding movement to said endless conveyor, distributor mechanism carried by said side walls and journalled therebetween in a fixed position above the rear end of said chassis for receiving manure from said conveying means and distributing the same rearwardly between said fixed side walls, means pivotally mounted at one end on said chassis and pivotally connected at the other end with said body structure for raising and lowering said body structure with respect to said chassis about the journalled end thereof, and drive means on said chassis for driving said distributor mechanism.

16. A manure spreader comprising a wheeled chassis, a liquid tight body structure disposed longitudinally of said chassis and journalled adjacent the rear end thereof whereby the front end of said body structure may be raised above said chassis for gravitating manure and associated liquid toward the rear end of said body structure, a pair of upwardly extending side walls fixedly mounted on the rear end of said chassis immediately adjacent the rear end of said body structure and between which said body structure is adapted to be tilted, the rear end of said body structure adjacent the journal thereof defining a well, conveying means carried by the rear end of said body structure for feeding manure and associated liquid rearwardly between said fixedly mounted side walls, said conveying means comprising an endless conveyor supported and journalled at one end in the upper portion of the rear end of said body structure adjacent said well and being swingable into and out of said well, distributor mechanism carried by said side walls and journalled therebetween in a fixed position above the rear end of said chassis for receiving manure from said conveying means and distributing the same rearwardly between said fixed side walls, means pivotally mounted at one end on said chassis and pivotally connected at the other end with said body structure for raising and lowering said body structure with respect to said chassis about the journalled end thereof, and drive means on said chassis for driving said distributor mechanism and said conveying means.

17. A manure spreader comprising a wheeled chassis, a liquid tight body structure disposed longitudinally of said chassis and journalled adjacent the rear end thereof whereby the front end of said body structure may be raised above said chassis for gravitating manure and associated liquid toward the rear end of said body structure, a pair of upwardly extending side walls fixedly mounted on the rear end of said chassis immediately adjacent the rear end of said body structure and between which said body structure is adapted to be tilted, conveying means carried by the rear end of said body structure for feeding manure and associated liquid rearwardly between said fixedly mounted side walls, distributor mechanism carried by said side walls and journalled therebetween in a fixed position above the rear end of said chassis for receiving manure from said conveying means and distributing the same rearwardly between said fixed side walls, said distributor mechanism including at least a pair of beater shafts having beater members thereon, the ends of said beater shafts projecting beyond at least one of said side walls beyond the tilting path of said body structure, means extending outside the tilting path of said body structure and supported on said chassis for driving said distributor mechanism and said conveying means, and means pivotally mounted at one end on said chassis and pivotally connected at the other end with said body structure for raising and lowering said body structure with respect to said chassis about the journalled end thereof.

References Cited in the file of this patent
UNITED STATES PATENTS

| | | |
|---|---|---|
| 365,195 | Oldham | June 21, 1887 |
| 1,248,303 | Fromme | Nov. 27, 1917 |
| 1,636,536 | Toomey | July 19, 1927 |
| 1,755,120 | Kerr | Apr. 15, 1930 |
| 1,969,173 | Hansen | Aug. 7, 1934 |
| 2,360,126 | Griffiths | Oct. 10, 1944 |
| 2,467,718 | Acton | Apr. 19, 1949 |
| 2,532,050 | Acton | Nov. 28, 1950 |
| 2,569,336 | Pratt | Sept. 25, 1951 |
| 2,653,028 | Templeton | Sept. 22, 1953 |
| 2,885,209 | Bruecker | May 5, 1959 |